Dec. 27, 1955     L. E. ELLISON     2,728,888
SPARK PLUG TESTER
Filed March 15, 1952
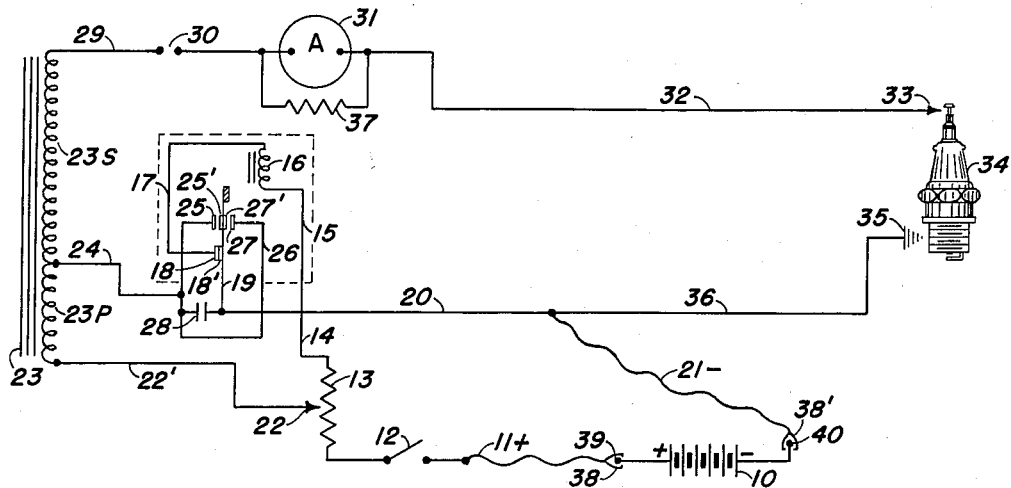
FIG. 1
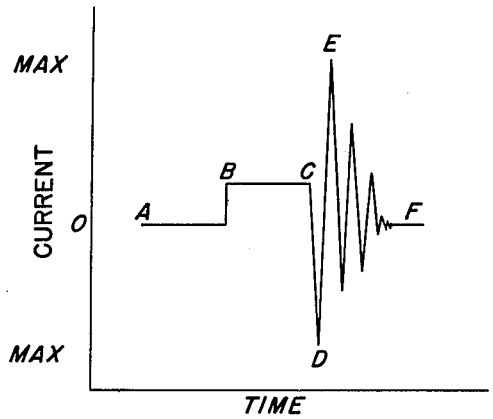
FIG. 2
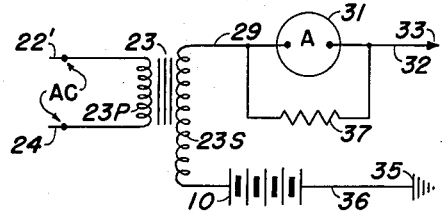
FIG. 3
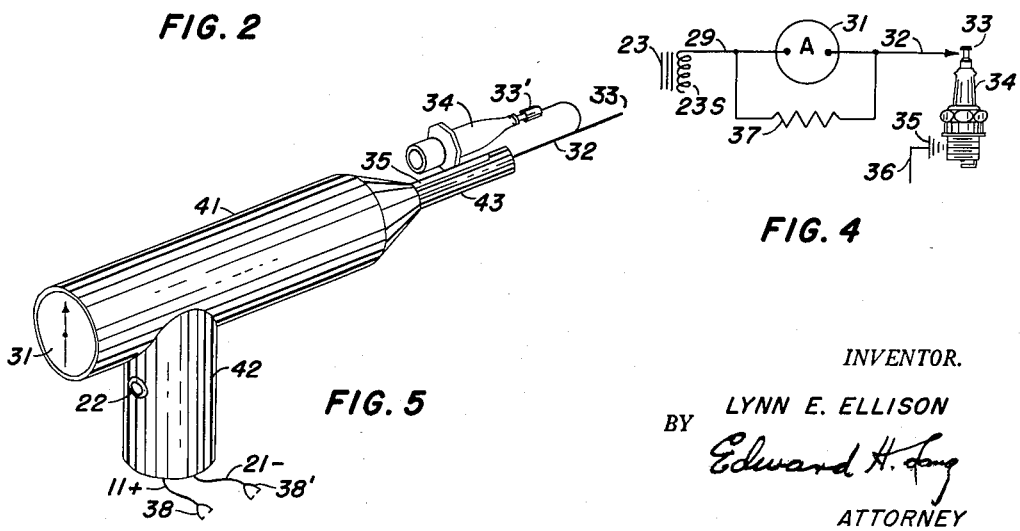
FIG. 4
FIG. 5
INVENTOR.
LYNN E. ELLISON
BY Edward H. Lang
ATTORNEY United States Patent Office 2,728,888
Patented Dec. 27, 1955

2,728,888

SPARK PLUG TESTER

Lynn E. Ellison, Crystal Lake, Ill., assignor to The Pure Oil Company, Chicago, Ill., a corporation of Ohio Application March 15, 1952, Serial No. 276,843

4 Claims. (Cl. 324—16)

This invention relates to a testing apparatus and, in particular, embodies a tester for the spark plugs of internal combustion engine ignition systems. The invention described herein is a continuation-in-part of application Serial Number 135,207 filed December 27, 1949, now abandoned.

Because spark plugs and difficulties encountered in their use are so common, a device which would permit simple routine testing of the plug in place in the engine to give a reliable indication of its condition is a great necessity. In response to such need, the devices which have been worked out for the testing of spark plugs are many and varied. For example, Coffey in United States Patent 2,100,837 takes advantage of the heat generated in an electric spark to determine the efficiency of spark plugs. In United States Patent 2,430,069 Mesh provides an apparatus which measures the gap between the electrodes of a spark plug by the amount of voltage which is necessary to apply to the plug to produce sparking, determining when sparking occurs by the use of an oscilloscope. However, in general, available devices suffer from a defect in common, which is that they are too complicated for use in routine service station testing such as could be performed during the interval of refueling an automobile.

Accordingly, it is a fundamental object of the instant invention to provide a simple and conveniently manipulated testing apparatus which concomitantly employs a direct current and an alternating current in the testing circuit. Another object is to provide a spark plug tester which can be used to determine the condition of a plug by means of a reading of a direct current energized electric meter in a simple electrical circuit.

It is a further object of the invention to provide a spark plug testing device which will use a direct current meter and will be operable from a power supply such as the storage battery found on the automobile.

It is another object of the invention to provide a spark plug tester which will give a reliable indication of the condition of the spark plug without the necessity of removing it from its place in the engine.

Other objects and advantages of the invention will in part be obvious and in part appear hereinafter.

In the preferred embodiment of the applicant's invention, the testing device embodies a circuit which draws its power from a direct current source such as a storage battery used in an automobile. This direct current not only supplies a pulsating signal to the primary coil of a transformer by means of a conventional vibratory device which, in effect, produces an alternating current in the secondary circuit, but also provides a source of direct current for the operation of the test circuit. In the preferred embodiment, the test circuit which is connected to the secondary coil of the transformer includes a controlled spark gap, direct current ammeter, and means for connecting the spark plug to be tested in series with the test circuit elements. Accordingly, the invention comprises the features of construction, combinations of elements and arrangements of parts embodied in the devices to be described hereinafter in greater detail which provide for the simultaneous passage of an alternating current and a direct current in the test circuit.

In the drawings accompanying this invention, Figure 1 represents a circuit diagram of a preferred embodiment of the invention. Figure 2 illustrates a graphical analysis of the current flow during one cycle of the testing circuit. Figure 3 illustrates a modification of the invention in which separate sources for the alternating current and direct current are utilized in the test circuit. Figure 4 is a sectional view of Figure 1 illustrating a further modification of the preferred embodiment. Figure 5 shows a housing for the circuit elements of the device designed for utility in routine service station testing operations.

Referring now to Figure 1, 10 represents a power supply, such as an automobile battery, which furnishes the voltage applied through lead 11+ to switch 12, voltage divider 13, leads 14 and 15 to coil 16 and thence through lead 17 to points 18 and 18', reed 19 to leads 20 and 21, back to the low voltage side of the power supply 10. Reed 19 is a thin, flexible strip prepared from suitable material such as steel which will conduct an electrical current. A small iron weight is affixed to the free end of the vibrator to impart inertia to the element and also function as an armature cooperating with coil 16. A second portion of the circuit starts with contact 22 on voltage divider 13 and includes lead 22', coil 23P of transformer 23, lead 24, points 25 and 25'. Lead 26 and two points, 27 and 27', are part of this circuit and function in the alternative with lead 24 and points 25 and 25'. The circuit is also completed through reed 19. Condenser 28 serves to absorb collapse voltage in operation of the circuit. The dotted line encompassing the vibrator circuit elements 15, 16, 17, 18, 18', 19, 25, 25', 26, 27, and 27' signifies that these elements are combined in a package unit which is commercially available.

Coil 23P is the primary of transformer 23 having an iron core and a secondary coil 23S which is serially interconnected to primary coil 23P and is further connected by line 29 in series with spark gap 30, ammeter 31, lead 32, to point 33, which is adapted to receive the center electrode of a spark plug such as 34 for testing. The test circuit is completed through point 35 which is adapted to be interconnected directly or indirectly to the ground electrode of spark plug 34 and line 36. The type of transformer that is employed in the electrical circuit embodied in the applicant's invention is known as an autotransformer. While generally this type of transformer is one having an iron core and one continuous winding with taps brought out for connections, a two coil iron core transformer may be used as an autotransformer by properly interconnecting the primary and secondary windings by a suitable conductor. In the circuit, resistor 37 is a shunt around the direct current ammeter 31 employed to give the meter a desired sensitivity. It is to be noted that meter 31 is energized by the direct current which is flowing in the test circuit concurrently with a high frequency alternating current to provide an electrical measurement which is indicative of the condition of the spark plug being tested.

Leads 11+ and 21− as shown represent flexible leads which are provided with clamp connectors 38 and 38', respectively, such as battery clips which respectively interconnect with terminals 39 and 40. This expedient is provided to permit the apparatus to utilize as a source of power an automobile storage battery as a substitute for battery 10 which is normally self contained within the apparatus housing. When this alternative is employed connectors 38 and 38' are disconnected from their respective terminals 39 and 40 and placed on the appropriate terminals of the automobile storage battery to provide a flow of current within the circuit as shown in Figure 1.

The operation of the device is substantially as follows: With the closing of the circuit by means of switch 12, current flows through voltage divider 13 where it divides in accordance with the placement of contact 22 on the resistor element of the voltage divider. The first path takes it through lines 14 and 15, coil 16 in the vibrator circuit through line 17, through normally closed contacts 18 and 18' producing a magnetic effect in coil 16 and attracting vibrator reed 19 causing it to bend toward normally open contact 27. This causes contacts 18 and 18' to separate interrupting the flow of current to coil 16. As a result coil 16 is no longer energized and the magnetic field induced collapses. The natural resilience of the vibrator reed 19 then causes it to overpass its normal position thereby closing contacts 25 and 25' and during this interval magnetic field has again built up in coil 16 causing it to repeat the cycle. Consequently when the vibrator reed 19 bends back and forth, the amplitude of the reed is increased until it reaches the natural frequency of the reed, thereby imparting greater movement to the reed and at a constant frequency. It can be thus seen that when the vibrator reed 19 oscillates contacts 27 and 27' shall make contact, while at the same time contacts 25 and 25' shall be open, and conversely, when contacts 25 and 25' are closed, contacts 27 and 27' are open. Also, it will be noted that when the vibrator reed is in the center position, contacts 27 and 27' and contacts 25 and 25' are open. Following the current as it passes from point 22 through primary 23P of transformer 23 through 24 to points 25 and 25' and line 26 to points 27 and 27', when the two sets of points are open no current flows in the primary 23P and a circuit condition A exists as shown by the graphical analysis of the current flow illustrated in Figure 2. When contacts 25 and 25' close condition B, as shown on the graph in Figure 2, exists. The current thus flowing in 23P magnetizes the core of transformer 23. When the vibrator reed 19 is in this position in its cycle the circuit which contains coil 16 is completed and a magnetic field is thereby established which attracts reed 19 thus separating points 25 and 25'. The current flow at point is indicated at point C in Figure 2. Current flow through 23P continues charging condenser 28 thus allowing contacts 25 and 25' to open without burning. Also at this point the magnetism or magnetic flux stored in the core of transformer 23 collapses, causing an induced voltage in the secondary winding 23S. This voltage charges condenser 28 higher. When the voltage in 23S reaches its peak, condenser 28 discharges, as shown at point D in Figure 2, producing current in primary 23P. This produces a magnetic flux build-up in the opposite direction as shown at point E of Figure 2. After the condenser is discharged the magnetic flux collapses again building up a high voltage in 23S and simultaneously inducing a voltage in 23P, thus charging condenser 28 again. On each charge and discharge the voltage decreases in amplitude in each successive cycle until it reaches zero, as shown at point F in Figure 2, whereafter the transformer and condenser are ready to repeat the foregoing cycle when contact is made through points 27 and 27'. In other words, a pulsating signal is produced in primary coil 23P of the transformer. The pulsating signal of direct current potential received by the primary coil 23P has the same effect as if an alternating E. M. F. signal were impressed across the primary coil of transformer 23. The expedient described herein for producing an alternating E. M. F. signal in the secondary 23S, which is connected in series with the other elements of the test section of the circuit, was adopted to provide a source of alternating current in the test section which could be obtained by means of a readily available direct current source of supply such as an automobile storage battery.

Referring to Figure 1 and the foregoing discussion it is seen that condenser 28 has several functions. First, as noted above, it absorbs the collapse voltage inherent in this type of circuit, secondly, it produces an alternating current in the secondary coil 23S of transformer 23 which is applied to the test circuit as explained above, and thirdly it produces a high direct current potential which flows by means of line 24 branching off into both the primary coil 23P and the secondary coil 23S. When it flows through primary coil 23P it produces a magnetic flux buildup as previously described. The portion that flows through secondary coil 23S also flows through the secondary circuit when the circuit is completed by the ionization of the air gaps. It will be seen from Figure 2 when the current cycle is in condition D the direct current flows with and is added to the induced high frequency alternating current in secondary coil 23S thereby operating direct current meter 31. The meter thus operates when the alternating current and direct current flowing in the test circuit have the same polarity. When the alternating current changes its polarity in completing its cycle the direct current potential then serves to cancel out the effect of this change in polarity of the current on the meter. Due to the inertia of the meter the position of meter needle remains unaffected and thereby gives a steady reading.

It is to be understood however that the circuit may also be designed to allow the use of an alternating current as a means for delivering energy to the primary coil 23P. This is illustrated by means of Figure 3. In this circuit an alternating current is supplied to the primary coil from a suitable source to produce a high frequency alternating current in test circuit. The source of direct current as in the preferred embodiment is provided by a suitable source such as battery 10. It is only of the essence that, regardless of the means by which it is effected, a high frequency alternating current and a direct current be provided in the test section of the circuit. Any such modifications which will accomplish this desired end are considered to be within the scope of the invention. Such modifications will be obvious to those who are skilled in the art.

As is seen from the foregoing description, the operation of the apparatus is based on the flow of alternating current and direct current in the testing section of the circuit. A further discussion of the operation upon which the invention is predicated will facilitate a better understanding of its operability. It is to be understood however that these postulations are set forth simply to assist in understanding the invention and are not to be construed so as to have a limiting effect on the scope of the invention.

In this explanation it will be assumed that a spark gap having adjustable electrodes by means of which the extent of the air gap between the electrodes may be varied is serially interconnected in the circuit shown in Figure 1 by means of leads 33 and 35. Initially the electrodes of this variable gap are placed in contact with each other producing a shorted electrical connection at this point. A sufficiently high voltage is then induced in the secondary coil 23S of the transformer 23 to ionize the air between the electrodes of spark gap 30. This voltage is increased until a full scale deflection is observed at ammeter 31. The effect of this increase in voltage is to decrease the resistance provided by spark gap 30 thus permitting more direct current to flow in the secondary circuit. The high voltage potential supplied by the alternating E. M. F. is then held constant at this point and the electrodes of the variable spark gap are gradually opened. The air gap separating the electrodes becomes ionized due to the high potential between the electrodes. However, as the hiatus between the electrodes is increased, the alternating current flowing across the ionized gap between the electrodes of the variable gap decreases thereby effectuating an increase in the resistance afforded by the adjustable spark gap. The result of this increased change in resistance is a decrease in the amount of direct current which is permitted to flow in the secondary circuit, a result which is evinced by the direct current ammeter 31. It is thus seen that the amount of direct current which flows in the secondary circuit is inversely proportional to the extent of the gap produced at the variable spark gap. This correlation between direct current flow and spacing between the electrodes of a variable spark gap permits the scale of ammeter 31 to be calibrated directly in units of mensuration corresponding to the gap between the electrodes or a chart to be prepared which permits the meter reading in electrical units to be translated into appropriate units of length.

After the initial calibration as described above of the apparatus has been effected, the recalibration of the meter prior to use as a testing device should be checked.

One method of calibration could entail short circuiting terminals 33 and 35. This, in effect, closes the spark gap which would normally exist if a sparking device were placed across these terminals. The flow of current in the test section of the circuit is then increased by means of variable resistor 13 until full scale deflection is obtained on the calibrated direct current ammeter 31 employed in the illustrative test circuit shown in Figures 1 and 2. Thereafter, in a test an unknown spark plug is put in series therewith and the amount of deflection will be a measure of the spark gap in the test plug.

While it is advantageous and preferred to have the spark gap 30 in the secondary circuit, its presence is not essential to carry out the invention described herein. Its primary function is to make the ammeter 31 more sensitive to variations in gaps between the electrodes of the spark plugs being examined thus providing an amplification effect. For example, the circuit illustrated in Figure 4 in the form of a fragmentary section of the secondary test circuit shown in its entirety in Figure 1 will also operatively function to test spark plugs.

Referring now to Figure 5 where there is shown a more functional embodiment of the preferred form of the invention, it will be seen that for convenience in use, it is constructed in the form of a small pistol-like hand tool comprising a housing 41 and a lower extended hand grip 42. The housing carries a forward tubular projection 43 upon which is mounted an electrode point designated 35, which point corresponds to point 35 in the circuit diagram shown in Figure 1. Also mounted on the tubular projection 43 of the instrument in the form of a testing lead is a semi-flexible extension 33 corresponding electrically to point 33 of the circuit diagram. There is also slidably mounted on extension 33 a flexible lead having a spring clip 33' affixed to its terminal end. This clip will receive the center electrode terminal of a spark plug. This test lead may take the form of a bracket which will hold the spark plug in place for a test when the spark plug has been removed from an engine block. Terminal 35 constitutes a second point for completing the test circuit when a plug is set in place as shown in the figure. The power to the device is furnished through conductors 11+ and 21− which are adapted to be clamped to the proper battery terminal and engine ground connection by clamps 38 and 38'. The housing of the instrument immediately above the hand grip carries a meter 31 corresponding to that shown in the diagram in Figure 1. The voltage divider 13, with movable contact 22, shown in Figure 1, appears in Figure 5 as an adjustable knob 22 which can be regulated to the appropriate position in calibrating the device. Although not visible in Figure 5 switch 12 shown in Figure 1 is also mounted in hand grip 42.

It will be seen that from this construction, the tool can be conveniently held like a pistol and while connected to the power supply of a spark ignited internal combustion engine by means of clamps 38 and 38', the operator can reach into the engine housing and test each of the spark plugs simply by contacting extension 33 with the center electrode of the spark plug which is being examined. The meter giving the indication of the condition of the plug is visible directly to the operator, and a convenient in-place test can be made. If the meter reading indicates that the spacing of the electrodes of the spark plug is 0.005 inch or more than the recommended spacing, the plug should be removed for inspection. It is to be noted that the automobile engine is stopped when this mode of testing is employed. This permits each spark plug to be tested under the same conditions of environment. Due to the vagaries of different automotive electrical circuits the apparatus should be calibrated prior to each use. This is simply done by contacting a convenient grounding point on the automobile chassis with extension 33 and properly adjusting the voltage divider to provide a meter reading on meter 31 which is indicative of a calibrated condition. When it is desired to remove the plugs from the engine for testing, the completion of the circuit is made by connecting lead 33' to the center electrode terminal of the spark plug and connecting the ground electrode of the spark plug to terminal 35. The only essential feature of this construction of the apparatus is to have terminals 33 and 35 separated from each other by insulating material, yet sufficiently close together to receive the spark plug when it is subjected to test out of the engine block.

The use of the instant invention is not confined to checking the spacing of the electrodes of a spark plug employed in internal combustion engines. A proper interpretation of the results shown on the meter 31 permit other diagnosis. For example, an erratic reading upon the meter indicates the center electrode or the grounding electrode of the spark plug has become worn or rounded. Furthermore, if readings are obtained which indicate a smaller electrode gap spacing than is present in a normal spark plug, the spark plug is shorted perhaps by carbon residue. Conversely if a lower reading than is normal is obtained this could mean that lead deposits have formed on the electrodes of the spark plug. In addition, if the meter does not indicate, the spark plug is no longer fit for service.

Though the apparatus has been described with only a single embodiment, it is to be understood that the example and drawing are illustrating preferred embodiments and not strict limitations on the exact arrangement of the parts.

What is claimed is:

1. A spark plug testing device comprising a step-up transformer having primary and secondary windings, a power source for delivering electrical energy to said primary windings which produces a high frequency oscillating E. M. F. of sufficient intensity of induce the ionization of the air gap between the electrodes of a normal spark plug in the secondary windings of said transformer and a secondary circuit connected with the secondary windings of said transformer comprising, in serial interconnection, a source of direct current potential, a means for measuring said direct current, two high potential electrodes separated by an air gap, and separate terminals for connecting the electrodes of the spark plug to be tested in series in said secondary circuit wherein a continuous and concurrent passage of high frequency oscillating current and direct current may be effected in said secondary circuit.

2. A spark plug tester comprising a step-up transformer having primary and secondary coils, a source of alternating current, said source being impressed across the said primary windings to produce in a secondary circuit a high frequency current of sufficient intensity to induce the ionization of the air gap between the electrodes of a normal spark plug, a secondary circuit which includes in serial interconnection with the secondary coil of said transformer, two high potential electrodes separated by an air gap, a source of direct current, a means for measuring said direct current, and terminals for separately connecting the electrodes of a spark plug to be tested in series in said secondary circuit wherein a continuous and concurrent passage of high frequency oscillating current and direct current may be effected in said secondary circuit.

3. A spark plug testing device which comprises a step-up transformer having a primary and a secondary coil serially interconnected, a primary circuit connected to said primary coil and a secondary circuit connected to said secondary coil, said primary circuit comprising a source of D. C. potential, an electromagnetically operated vibrating reed circuit interrupter, said interrupter serving to establish a high frequency oscillating current in said primary coil to produce in said secondary coil a high voltage of sufficient intensity to induce ionization of the air gap of the electrodes of a normal spark plug, said secondary circuit comprising in serial interconnection a means for measuring the flow of direct current in said secondary circuit, two high potential electrodes separated by an air gap, and a means for separately connecting the electrodes of a spark plug to be tested in series in said secondary circuit.

4. A spark plug testing device which comprises a step-up transformer having a primary coil and a secondary coil, said coils being serially interconnected, a primary circuit connected to said primary coil and a secondary circuit connected to said secondary coil, said primary circuit comprising a source of D. C. potential, an electromagnetically operated vibrating reed circuit interrupter which comprises an electromagnet, a double throw normally open vibrating reed contact arm oscillated by said electromagnet, a first normally open contact point and a second normally open contact point, each of said points being alternately engaged by said contact arm when said contact arm is being oscillated by said electromagnet, a third normally closed contact point in direct engagement with said contact arm, said third contact point controlling an inttermittent flow of current to said electromagnet, a capacitator connected in parallel between said contact arm, and said first and second contact points whereby an oscillating current of high frequency is established in said primary coil, a potentiometer forming a first branch circuit and a second branch circuit, said first branch circuit being connected to said first and second contact points and said second branch circuit being contacted to said electromagnet and said third contact point, said secondary circuit comprising in serial interconnection a means for measuring the quantity of direct current flow in said secondary circuit, two high potential electrodes separated by an air gap, and a means for separately connecting the electrodes of a spark plug in series in said secondary circuit.

References Cited in the file of this patent
UNITED STATES PATENTS

| | | |
|---|---|---|
| 1,873,121 | Hartzell | Aug. 23, 1932 |
| 2,071,599 | Wefers | Feb. 23, 1937 |
| 2,257,958 | Holcombe | Oct. 7, 1941 |
| 2,312,840 | Lansdale | Mar. 2, 1943 |
| 2,324,458 | Peters et al. | July 13, 1943 |